(12) United States Patent
Miller

(10) Patent No.: US 9,055,260 B2
(45) Date of Patent: Jun. 9, 2015

(54) ELECTRONIC PROGRAM GUIDE GENERATION APPARATUS, SYSTEMS, AND METHODS

(75) Inventor: Kerry Philip Miller, El Segundo, CA (US)

(73) Assignee: EchoStar Technologies L.L.C., Englewood, CO (US)

( * ) Notice: Subject to any disclaimer, the term of this patent is extended or adjusted under 35 U.S.C. 154(b) by 1058 days.

(21) Appl. No.: 11/958,312

(22) Filed: Dec. 17, 2007

(65) Prior Publication Data

US 2009/0158341 A1 Jun. 18, 2009

(51) Int. Cl.
- *H04H 60/32* (2008.01)
- *G06F 3/00* (2006.01)
- *G06F 13/00* (2006.01)
- *H04N 5/445* (2011.01)
- *H04N 7/16* (2011.01)
- *H04N 21/45* (2011.01)
- *H04N 21/482* (2011.01)

(52) U.S. Cl.
CPC ............ *H04N 5/44543* (2013.01); *H04N 7/163* (2013.01); *H04N 21/4532* (2013.01); *H04N 21/482* (2013.01)

(58) Field of Classification Search
CPC ......................... H04N 21/4532; H04N 21/482
USPC ...................... 725/9, 11, 14, 37–61
See application file for complete search history.

(56) References Cited

U.S. PATENT DOCUMENTS

| | | | |
|---|---|---|---|
| 6,005,561 A * | 12/1999 | Hawkins et al. | 725/37 |
| 6,438,752 B1 * | 8/2002 | McClard | 725/46 |
| 6,637,029 B1 | 10/2003 | Maissel et al. | |
| 6,813,775 B1 * | 11/2004 | Finseth et al. | 725/46 |
| 6,898,762 B2 * | 5/2005 | Ellis et al. | 725/46 |
| 7,065,777 B2 * | 6/2006 | Inoue | 725/43 |
| 7,690,012 B2 | 3/2010 | Luehrs | |
| 2002/0059094 A1 * | 5/2002 | Hosea et al. | 705/10 |
| 2002/0059588 A1 * | 5/2002 | Huber et al. | 725/35 |
| 2002/0059642 A1 * | 5/2002 | Russ et al. | 725/135 |
| 2002/0112237 A1 * | 8/2002 | Kelts | 725/39 |
| 2002/0129368 A1 * | 9/2002 | Schlack et al. | 725/46 |
| 2002/0188947 A1 | 12/2002 | Wang et al. | |
| 2003/0020744 A1 * | 1/2003 | Ellis et al. | 345/723 |
| 2003/0084448 A1 * | 5/2003 | Soundararajan | 725/46 |

(Continued)

FOREIGN PATENT DOCUMENTS

| | | |
|---|---|---|
| EP | 2 017 724 A1 | 1/2009 |
| JP | 2000293539 | 10/2000 |
| WO | 0225939 A2 | 3/2002 |

OTHER PUBLICATIONS

Office Action (with English Translation), cited in Chinese Application No. 200810172327.1, issued Apr. 14, 2010, 6 pages.

(Continued)

*Primary Examiner* — Randy Flynn

(74) *Attorney, Agent, or Firm* — Seed IP Law Group PLLC

(57) ABSTRACT

Various embodiments determine electronic program guide information based on user viewing habits. One embodiment provides an electronic program guide generator that receives usage information that includes indications of a plurality of viewed channels, determines one or more channels of the plurality of viewed channels based on the received usage information, and provides indications of the determined one or more channels.

27 Claims, 6 Drawing Sheets

| FAVORITES: CHANNEL | NUMBER | 8:00PM | 8:30PM | 9:00PM | 9:30PM |
|---|---|---|---|---|---|
| DDD NEWS | 43 | NEWS | CRIME NEWS | CELEBRITY NEWS | LOCAL NEWS |
| CCC SPORTS | 13 | SOCCER | | | DARTS |
| BBB MOVIES | 155 | A FIRST MOVIE | | A SECOND MOVIE | |
| AAA SPORTS | 234 | PING PONG | GOLF WEEK | COMPETITIVE EATING | |
| EEE SPORTS | 133 | MONDAY NIGHT POKER | | | FISHING |
| ... | | | | | |

(56) References Cited

U.S. PATENT DOCUMENTS

| | | | |
|---|---|---|---|
| 2003/0093792 A1* | 5/2003 | Labeeb et al. | 725/46 |
| 2003/0106058 A1* | 6/2003 | Zimmerman et al. | 725/46 |
| 2003/0145326 A1* | 7/2003 | Gutta et al. | 725/46 |
| 2003/0226146 A1* | 12/2003 | Thurston et al. | 725/46 |
| 2004/0203639 A1 | 10/2004 | Ozer et al. | |
| 2005/0102696 A1* | 5/2005 | Westberg | 725/46 |
| 2005/0160456 A1 | 7/2005 | Moskowitz | |
| 2005/0160458 A1* | 7/2005 | Baumgartner | 725/46 |
| 2006/0041904 A1* | 2/2006 | Lee | 725/46 |
| 2006/0179454 A1* | 8/2006 | Shusman | 725/45 |
| 2006/0280046 A1 | 12/2006 | Togashi et al. | |
| 2007/0118866 A1* | 5/2007 | Chen | 725/38 |
| 2007/0169148 A1* | 7/2007 | Oddo et al. | 725/34 |
| 2007/0174862 A1 | 7/2007 | Kushida et al. | |
| 2007/0266407 A1 | 11/2007 | Yum | |
| 2009/0158341 A1 | 6/2009 | Miller | |
| 2009/0307726 A1* | 12/2009 | Levin et al. | 725/46 |

OTHER PUBLICATIONS

Extended European Search Report dated Jun. 6, 2011, for EP App. No. EP 11 16 2898, 9 pages.

Office Action (with English Translation) issued in corresponding ROC (Taiwan) App. No. 097137999, issued May 25, 2012, 21 pages.

European Search Opinion; cf Form 1507; 08,171,993.2; 5 pages.

European Search Report; EP 08,17,1993; Mar. 26, 2009; 2 pages.

Office Action, for U.S. Appl. No. 11/961,873, mailed Jul. 6, 2010, 12 pages.

Office Action, for U.S. Appl. No. 11/961,873, mailed Oct. 6, 2010, 12 pages.

Office Action, for U.S. Appl. No. 11/961,873, mailed Aug. 17, 2011, 12 pages.

Office Action, for U.S. Appl. No. 11/961,873, mailed Dec. 7, 2011, 13 pages.

Advisory Action, for U.S. Appl. No. 11/961,873, mailed Apr. 3, 2012, 3 pages.

Appeal Brief, for U.S. Appl. No. 11/961,873, mailed Aug. 7, 2012, 19 pages.

\* cited by examiner

| | ChannelNumber | USER | StartTime | ViewTime | ProgramID | ... |
|---|---|---|---|---|---|---|
| | 302a | 302b | 302c | 302d | 302e | 302f |
| 304a | 13 | BOB | 2007-03-04-17:32:56 | 45 | 1234 | |
| 304b | 43 | ... | 2007-03-05-15:02:51 | 6 | 1009 | |
| 304c | 13 | BOB | 2007-03-05-16:22:26 | 2 | 3473 | |
| 304d | 234 | BOB | 2007-03-05-16:24:55 | 23 | 2399 | |
| 304e | 43 | ALICE | 2007-03-05-16:47:03 | 45 | 3634 | |
| 304f | 234 | ALICE | 2007-03-05-17:32:28 | 107 | 0155 | |
| 304g | 13 | ... | 2007-03-07-13:01:43 | 3 | 6703 | |
| 304h | 133 | BOB | 2007-03-08-19:29:37 | 1 | 5699 | |
| 304i | 110 | ALICE | 2007-03-08-22:08:01 | 84 | 3421 | |
| 304j | ... | | | | | |

FIG.3

ELECTRONIC PROGRAM GUIDE GENERATION APPARATUS, SYSTEMS, AND METHODS

TECHNICAL FIELD

The technical field relates to electronic program guide generation systems and methods for audio/video/data content providers and, more particularly, to apparatus, systems and methods for generation of electronic program guides based on previously viewed channels of video programming.

BRIEF SUMMARY

In one embodiment, an apparatus that determines electronic program guide information is provided. The apparatus includes a video processing system operable to present video programming, and an electronic program guide generator that is communicatively coupled to the video processing system. The electronic program guide generator is operable to determine one or more channels of video programming of interest based on usage information that includes indications of previously viewed channels of video programming, and to provide indications of the determined one or more channels of video programming of interest to the video processing system.

In another embodiment, a method to determine electronic program guide information is provided. The method includes receiving usage information that includes indications of a plurality of video channels viewed via a set-top box operable to receive digital video programming via a broadcast network, determining one or more channels of the plurality of video channels based on the received usage information, and providing to a presentation device communicatively coupled to the set-top box indications of the determined one or more channels as part of an electronic program guide.

In another embodiment, a computer-readable medium is provided, the computer-readable medium including contents that enable a computing system to determine electronic program guide information, by performing a method such as the above.

BRIEF DESCRIPTION OF THE DRAWINGS

The components in the drawings are not necessarily to scale relative to each other. Like reference numerals designate corresponding parts throughout the several views.

FIG. 3 is a table illustrating example usage information tracked by an example embodiment.

DETAILED DESCRIPTION

A. Communication System Overview

Figure 1:
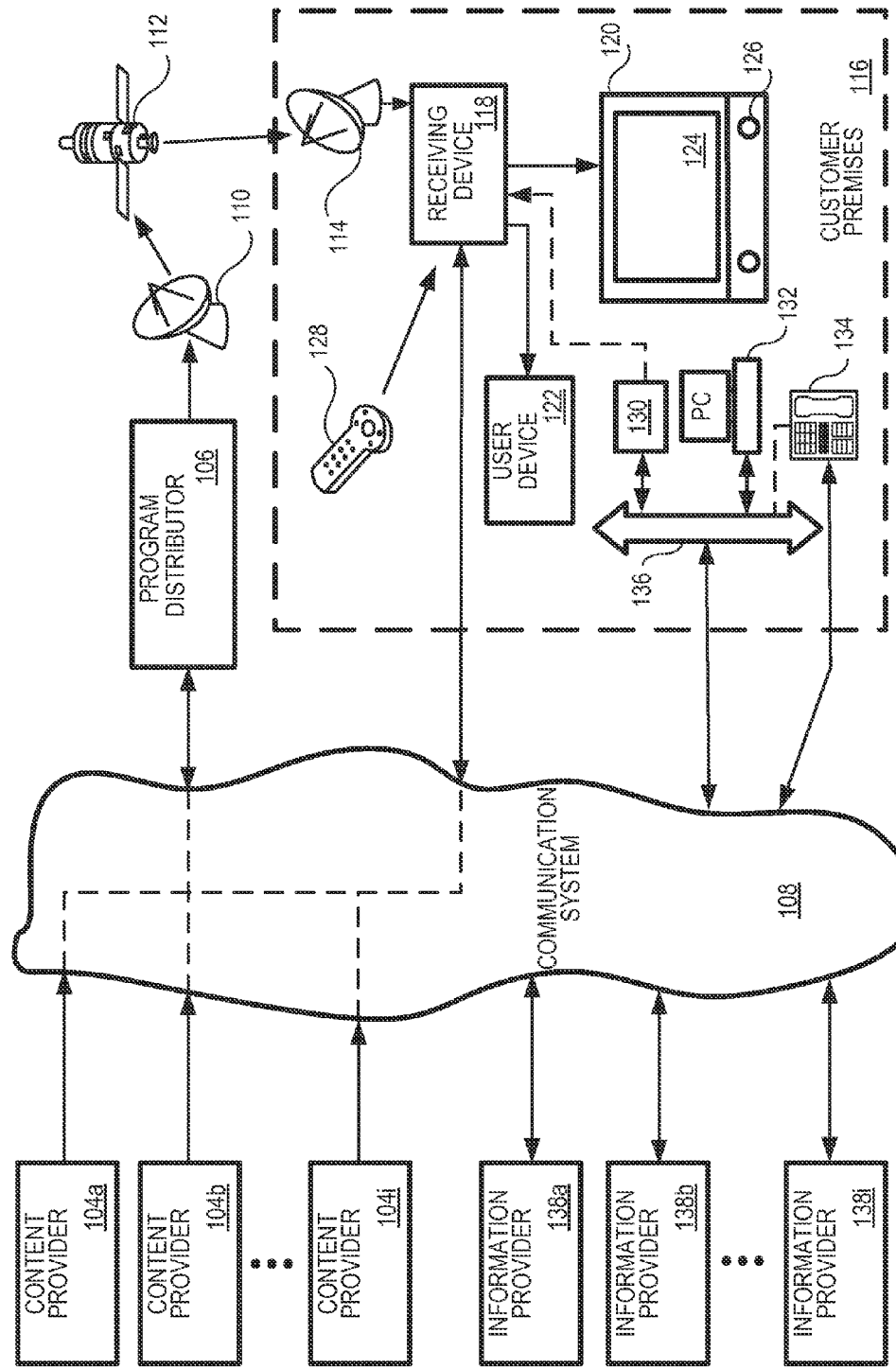
FIG. 1 is a block diagram illustrating an example communication system in which embodiments of an electronic program guide generator may be implemented.

FIG. 1 is an overview block diagram illustrating an example communication system 102 in which embodiments of an electronic program guide generator may be implemented. It is to be appreciated that FIG. 1 is just one example of a communications system and that the various embodiments discussed herein are not limited to such exemplary systems. Communication system 102 can include a variety of communication systems and can use a variety of communication media including, but not limited to, satellite wireless media.

Television service providers provide their customers a multitude of audio/video and/or data programming (hereafter, collectively and/or exclusively "programming"). Such programming is often provided by use of a receiving device 118 (FIG. 1) communicatively coupled to a presentation device 120 configured to receive the programming.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the presentation device 120 and other user devices 122.

Examples of a presentation device 120 include, but are not limited to, a television (TV), a personal computer (PC), a sound system receiver, a digital video recorder (DVR), a compact disk (CD) device, game system, or the like. Presentation devices 120 employ a display 124, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A plurality of content providers 104a-104i provide program content, such as television content or audio content, to a distributor, such as the program distributor 106. Exemplary content providers 104a-104i include television stations which provide local or national television programming, special content providers which provide premium based programming or pay-per-view programming, or radio stations which provide audio programming.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, cable systems, fiber optic systems, microwave systems, asynchronous transfer mode (ATM) systems, frame relay systems, digital subscriber line (DSL) systems, radio frequency (RF) systems, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite system to the program distributor 106.

In at least one embodiment, the received program content is converted by one or more devices (not shown) as necessary at the program distributor 106 into a suitable signal that is communicated (i.e.; "uplinked") by one or more antennas 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antennae 114 are operable to receive signals from a single satellite 112. Other types of receiver antennae 114 are operable to receive signals from multiple satellites 112 and/or from terrestrial based transmitters.

The receiver antenna 114 can be located at a customer premises 116. Examples of customer premises 116 include a residence, a business, or any other suitable location operable to receive signals from satellite 112. The received signal is communicated, typically over a hard-wire connection, to a receiving device 118. The receiving device 118 is a conversion device that converts, also referred to as formatting, the received signal from antenna 114 into a signal suitable for communication to a presentation device 120 and/or a user device 122. Often, the receiver antenna 114 is of a parabolic shape that may be mounted on the side or roof of a structure. Other antenna configurations can include, but are not limited to, phased arrays, wands, or other dishes.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television (TV) or the like, and/or to a user device 122. It is to be appreciated that presentation device 120 may be any suitable device operable to present a program having video information and/or audio information.

User device 122 may be any suitable device that is operable to receive a signal from the receiving device 118, another endpoint device, or from other devices external to the customer premises 116. Additional non-limiting examples of user device 122 include optical media recorders, such as a compact disk (CD) recorder, a digital versatile disc or digital video disc (DVD) recorder, a digital video recorder (DVR), or a personal video recorder (PVR). User device 122 may also include game devices, magnetic tape type recorders, RF transceivers, and personal computers (PCs).

Interface between the receiving device 118 and a user (not shown) may be provided by a hand-held remote device 128. Remote 128 typically communicates with the receiving device 118 using a suitable wireless medium, such as infrared (IR), RF, or the like. Other devices (not shown) may also be communicatively coupled to the receiving device 118 so as to provide user instructions. Non-limiting examples include game device controllers.

The receiving device 118 may receive programming partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Customer premises 116 may include other devices which are communicatively coupled to communication system 108 via a suitable media. For example, but not limited to, some customer premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network (LAN) system, or the like, One or more endpoint devices, such as PCs, data storage devices, TVs, game systems, sound system receivers, Internet connection devices, digital subscriber loop (DSL) devices, wireless LAN, WiFi, Worldwide Interoperability for Microwave Access (WiMax), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116. For example, information provider 138a may provide requested information of interest to PC 132. Information providers 138a-138i may further perform various transactions, such as when a user purchases a product or service via their PC 132.

The above description of the communication system 102 and the customer premises 116, and the various devices therein, is intended as a broad, non-limiting overview of an exemplary environment in which various embodiments of an electronic program guide generator may be implemented. The communication system 102, and the various devices therein, may contain other devices, systems and/or media not specifically described herein.

As noted above, the signal received by the receiving device 118 may include a plurality of multiplexed program content streams. Various forms of multiplexing are contemplated, including, but not limited to, time-based, frequency-based, code-based, etc. In some embodiments, each content stream may be associated with a particular "channel." As used herein, the term "channel" is not to be interpreted as a carrier frequency, as it might be in the context of an analog broadcast television service. Rather, as used herein, a "channel" is used as an indicator of source that may identify a particular entity, such as a content provider 104a-104i and/or a program distributor 106, that provides programming. In this manner, channel may be considered "meta" information about a particular content stream that may be used to logically organize and/or otherwise present programming to users in a familiar manner, based on their experiences with traditional broadcasting. Of course, other information may in addition or instead be associated with the plurality of content streams, such as numbers, categories, types, tags, ratings, summaries, etc.

In some instances, information about available programming may be provided to a user by displaying an electronic programming guide ("EPG") on the presentation device 120. An electronic program guide typically includes information about one or more programs, such as channel, scheduled start time, scheduled end time, a textual program summary, a program rating, etc. In some cases, an electronic program guide may be displayed as a two-dimensional grid, with channels displayed along a first dimension and time displayed along a second dimension. For example, a displayed electronic program guide may include eight channels vertically arranged in increasing order of channel number, and for each displayed channel, a horizontal arrangement of programs that will be carried by that channel during the next two hours.

In some cases, it may be difficult for users to obtain information about programming of interest with an electronic program guide. For example, a user may interact with the electronic program guide in various ways, such as by scrolling through the list of channels, scrolling forward and/or backward in time, selecting programs to obtain more information about a selected program, etc. However, given the large number of available channels, it may be inefficient to scroll through all channels to find a program of interest. In addition, a user may manually search and/or organize an electronic program guide based on various criteria, such as by program name, program category, channel category, program start time, etc. In other cases, a user may create a personal electronic program guide by manually entering channels that they frequently view, so that they may efficiently access frequently watched channels and/or other channels of interest. However, many users may lack the technical sophistication required to search an electronic program guide and/or create a personal electronic program.

Accordingly, the various embodiments disclosed herein, whether used singularly or in combination, may use and/or provide various techniques to facilitate the automatic generation of electronic program guides based on user viewing habits. The techniques may include tracking usage information with respect to receiving device 118 and/or presentation device 120. Tracking usage information may include, for example, recording information about channels of video programming viewed by a user, such as by recording indications of channels that have been selected by a user for viewing via receiving device 118. Usage information may also include time and/or date of viewing, duration of viewing, identity of the viewer, an indication of the program viewed, etc. Then, an electronic program guide may be generated based on the tracked usage information. Generating an electronic program guide may include automatically filtering, arranging, and/or otherwise processing a set of indications of previously viewed channels based on various criteria, such as viewing frequency, viewing recency, viewing duration, viewing time, channel category, user identity, etc. The generated electronic program guide may include indications of one or more channels of video programming, based at least in part on the usage information. In at least some embodiments, some of the described techniques are performed by an electronic program guide generator ("EPGG"), described below.

B. Electronic Program Guide Generator Overview

Figure 2:
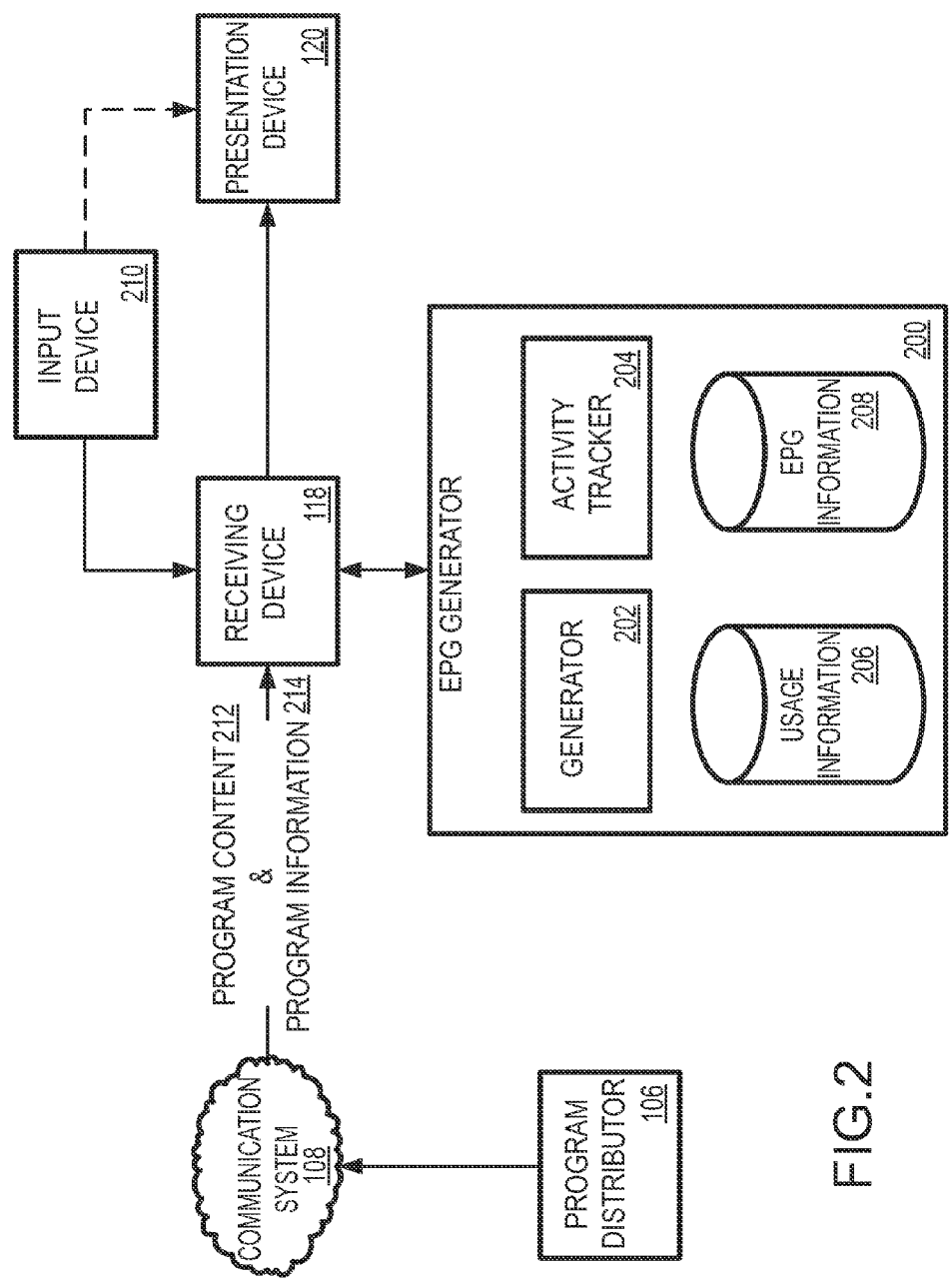
FIG. 2 is a block diagram illustrating example functional elements of an example embodiment.

FIG. 2 is a block diagram illustrating example functional elements of an example embodiment. In particular, FIG. 2 shows an example electronic program guide generator ("EPGG") 200 comprising a generator 202, an activity tracker 204, a usage information data repository 206, and an electronic program guide information data repository 208. The EPGG 200 is communicatively coupled to receiving device 118. The receiving device 118 is communicatively coupled to a communication system 108, an input device 210, and a presentation device 120. The input device 210 may also, or alternatively, be communicatively coupled to the presentation device 120. In addition, the communication system 108 is communicatively coupled to a program distributor 106.

In one example, the receiving device 118 receives program content 212 and program information 214 from the program distributor 106 via the communication system 108. The program content 212 may include one or more content streams of video, audio, and/or data. The one or more content streams may be physically organized in various ways, such as being time multiplexed over one or more carrier signals. In addition, the content streams may be logically organized in various ways, such as by channel, class, category, type, etc., as determined by the received program information 214. The program information 214 includes various types of information about programming distributed by program distributor 106, including programs transmitted in the past, present, and future. More specifically, the program information 214 may include channel identifiers (e.g., channel numbers, channel names, etc.), program times, program summaries, program ratings, program and/or channel categories (e.g., sports, news, weather, etc.), etc.

A user may utilize input device 210 to control the receiving device 118, such as by indicating a particular channel to be presented by the receiving device 118 on the presentation device 120. Input device 210 may be, for example, a remote control 128, or any other device that is communicatively coupled to the receiving device 118 and that is configured to provide control inputs to the receiving device 118, such as a keyboard, a mouse, a microphone, a joystick, etc.

In response to a selection of a particular channel, the receiving device 118 transmits program content corresponding to the selected channel to the presentation device 120. In particular, the receiving device 118 selects one or more content streams that are part of the received program content 212 and that are associated with the selected channel. The selected content streams may then be decrypted, decompressed, formatted, and/or otherwise processed prior to being transmitted to the presentation device 120.

The EPGG 200 automatically generates electronic program guide information based on the operation of the receiving device 118. In particular, the activity tracker 204 may track usage information that reflects the operational state of the receiving device over time. For example, when a user selects a channel on the receiving device 118, the activity tracker 204 may store a record in the usage information data repository 206 reflecting the occurrence of this event. The recorded usage information may include information such as an indication of the channel selected (e.g., a channel identifier, a number, etc.), an indication of the program being viewed (e.g., a program identifier, a program name, etc.), date, time, user identity, etc.

Over time, the usage information data repository 206 will accumulate a history of user interactions, which can be utilized by the generator 202 to automatically generate an electronic program guide, based on the interests of one or more users that access programming via the receiving device 118. In particular, the generator 202 may process, filter, and/or arrange the information stored in the usage information repository 206 to determine one or more channels that may of interest to a user of the receiving device 118, based on the past interactions of the user with the receiving device 118. For example, the generator 202 may determine a list of one or more channels that meet one or more specified criteria, such as those channels that are the most frequently viewed, are the most recently viewed, have the greatest total viewing time, are viewed by a particular user, etc.

The electronic program guide information determined by the generator 202 may be provided directly to the receiving device 118 for display on the presentation device 120, stored in the EPG information data repository 208, and/or provided to some other component/device. The EPGG 200 may determine electronic program guide information in response to the occurrence of one or more specified events, such as an elapsed amount of time (e.g., once per hour), a received user input event (e.g., a user request to view an EPG), a received command from the program distributor 106, etc.

Figure 5:
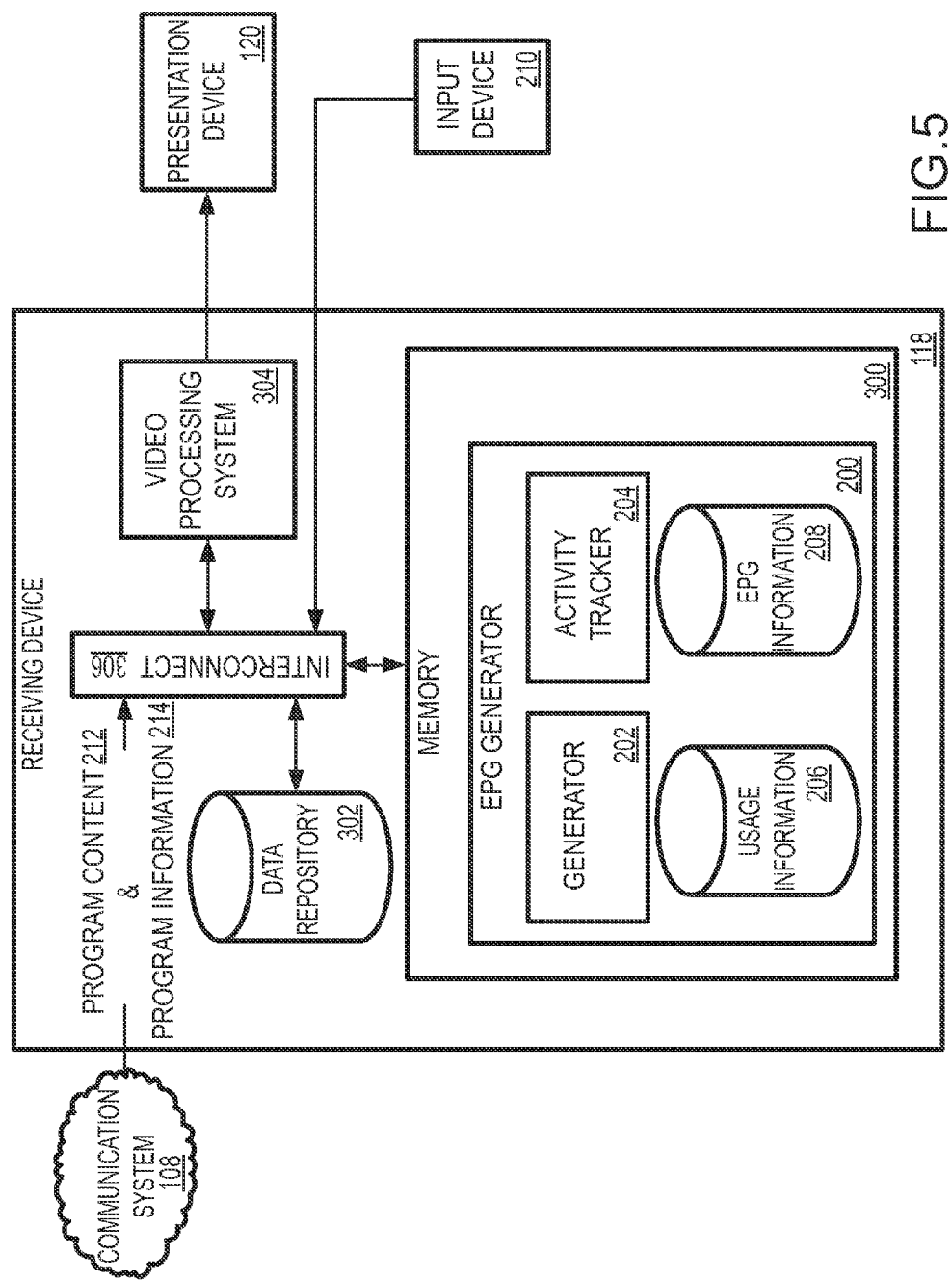
FIG. 5 is a block diagram illustrating an example embodiment of an electronic program guide generator implemented in a receiving device.

In one example, the EPGG 200 is depicted as separate from the receiving device 118 and the presentation device 120. There is no requirement that the EPGG 200 be located on a user premises or at a customer's location. Provided the EPGG 200 can obtain information about a user's program viewing habits, the EPGG 200 may be located remotely, such as at the program distributor 106. In other embodiments, the EPGG 200 may be, for example, part of the receiving device 118, as illustrated in FIG. 5.

FIG. 3 is a table illustrating example usage information tracked by an example embodiment. In particular, FIG. 3 shows a table 300 having usage information arranged in rows 304a-304j and columns 302a-302f. Each row 304a-304j includes information about a single viewing period, including channel number 302a, user identity 302b, viewing start time 302c, viewing period time 302d in minutes, and program identifier ("ID") 302e. The table 300 illustrates example usage information that may be stored, for example, in the usage information data repository 206, described with reference to FIG. 2.

The example usage information includes information about multiple viewing periods. For example, row 304a contains a record indicating that a user identified as "Bob" viewed program 1234 on channel 13 starting at 17:32 (5:32 PM) and 56 seconds, on Mar. 4, 2007, for a total of 45 minutes. Row 304b contains a record indicating that an unknown user viewed program 1009 on channel 43 starting at 15:02 (3:02 PM) and 51 seconds, on Mar. 5, 2007, for a total of 6 minutes.

The one embodiment tracks information about which user is viewing particular programming. For example, rows 304a, 304c, 304d, and 304h identify the viewing user as "Bob"; rows 304e, 304f, and 304i identify the viewing user as "Alice"; and rows 304b and 304g indicate that a viewing user was not identifiable, as indicated by "--." Users may be identified in various ways. In some cases, a user may self-identify, such as by indicating their identity prior to a viewing session. In other cases, a user identity may be determined by reference to some other system information. For example, in the context of a personal computer, a user may be identified by reference to the current user that is logged into the personal computer. In other embodiments, users may be identified without knowledge of the user, such as via biometric sensors (e.g., fingerprint detectors) installed on input devices that are configured to automatically identify the user operating the device.

In other embodiments, more or less information may be recorded and/or utilized, as indicated by column 302f and row 304j. For example, some embodiments may not record a program identifier for each viewing period, since that information may be obtained in other ways, such as by reference to program information that provides a mapping between channel, time, and program identifier. In addition, other types of events relating to program viewing and/or device usage may be recorded, such as power on, power off, utilization of subtitles or closed captioning, etc. Furthermore, usage information may be structured in other ways and/or represented using other units. For example, viewing period time 302d may be represented in seconds, rather than minutes. Also, some embodiments may not record viewing period time at all, given that this information may be later computed based on the time difference between consecutive channel selection events.

In addition, some embodiments may not record usage information on a channel viewing period basis. Instead, they may simply accumulate total viewing time on a per-channel basis, such as by establishing a time counter for each channel, and incrementing each channel time counter every time that channel is viewed.

Figure 4:
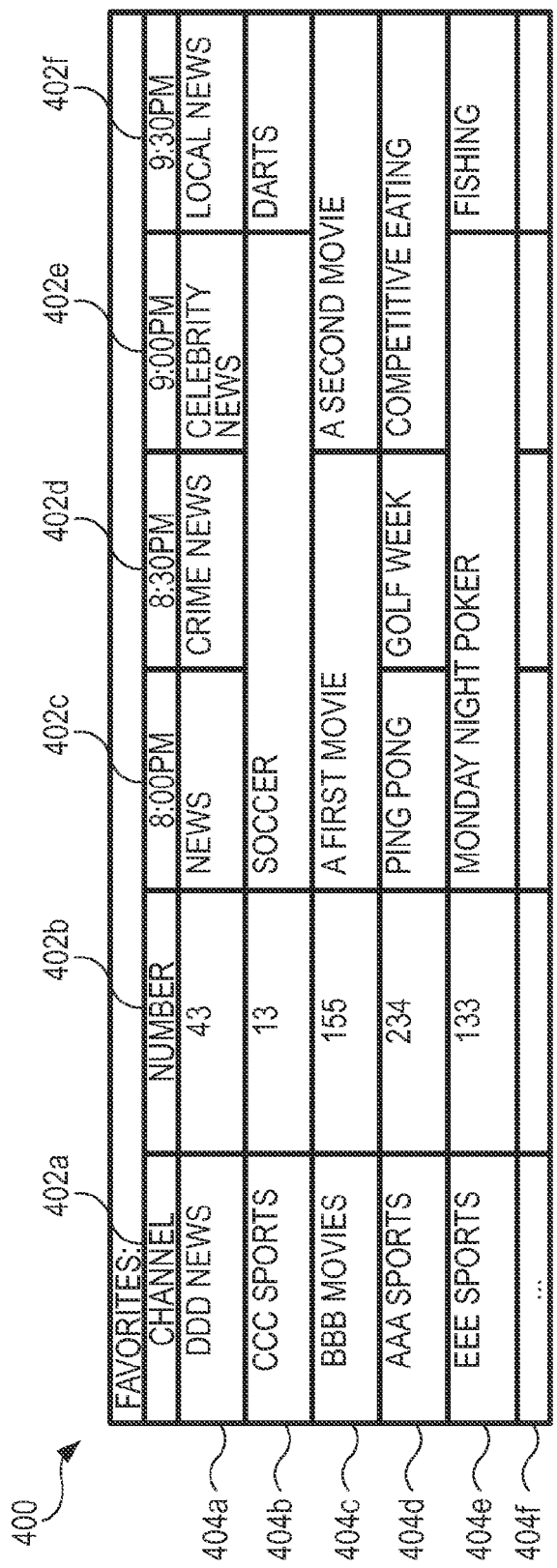
FIG. 4 is an example electronic program guide generated by an example embodiment.

FIG. 4 is an example electronic program guide generated by an example embodiment. In particular, FIG. 4 shows a display of an electronic program guide 400 that may be displayed, for example, on a presentation device 120, upon a request received from a user. The guide 400 comprises a table that includes channel information arranged in rows 404a-404f and columns 402a-402f. Each row 404a-404f includes information about a single channel, including a channel name 402a, a channel number 402b, a first time slot 402c, a second time slot 402d, a third time slot 402e, and a fourth time slot 402f. The displayed electronic program guide 400 may be interactive, in that it may include user selectable controls, such as buttons, text, links, arrows, etc., that may be selected by a user to scroll, expand, collapse, or otherwise interact with the electronic program guide 400.

The electronic program guide 400 includes information about multiple channels that have been selected based on usage information. For example, the EPGG 200 may process usage information, such as that described with reference to FIG. 3, in order to determine, for each channel, a total viewing time. Then, the channels may be ordered in decreasing order of total viewing time and presented as the electronic program guide 400, such that a channel having the highest total viewing time appears at the top of the electronic program guide 400. In some embodiments, the channels may be filtered in various ways, such as to only display a specified number of channels, channels viewed by a particular user, channels of a specified category, and/or channels meeting some other criterion, such as those viewed within a particular time period (e.g., Monday nights).

In some embodiments, a user may specify at least some of the criteria that should be used in generating one or more electronic program guides. For example, a user may specify that a first electronic program guide only include sports channels watched during the last month, ordered by total time viewed. The user may also specify that a second electronic program guide only include family channels watched on Saturday mornings. In this manner, multiple "custom" electronic program guides may be generated that reflect programming of interest to particular members of a given household, where the electronic program guides are populated with channels that are based on actual viewing habits of the household members. As those viewing habits change over time, the electronic program guides will be automatically modified to reflect the changed habits.

In addition, in some embodiments, the electronic program guide 400 may include suggested programming, as may be determined based at least in part on usage information gathered by the EPGG 200. For example, the EPGG 200 may determine that a particular user is an avid viewer of sports programming, based on the fact that they spend a significant portion of their viewing time watching channels that carry sports programming. In such a case, the EPGG 200 may include one or more additional channels in the electronic program guide 400, such a sports channel that has recently been added to a particular subscription package, in order to notify the user of the new channel. In some cases, such recommendations may be made based on payments received by, for example, the program distributor 106 from a content provider that provides the recommended channel, so as to serve as targeted, paid program/channel placements. Other types of content, such as targeted product advertisements based on viewing habits, may also be included. For example, a portion of the electronic program guide 400 may include a banner or other indication of a particular good or service that is related to frequently viewed programming, as determined by the usage information gathered by the EPGG 200.

C. Receiving Device Overview

FIG. 5 is a block diagram illustrating an example embodiment of an electronic program guide generator 200 implemented in a receiving device 118. In the illustrated example, the receiving device 118 comprises a memory 300, a data repository 302, a video processing system 304, and an interconnect 306. The memory 300, data repository 302, and video processing system 304 are communicatively coupled to one another via the interconnect 306. The memory 300 includes an electronic program guide generator 200 comprising a generator 202, an activity tracker 204, a usage information data repository 206, and an electronic program guide information data repository 208, as described with reference to FIG. 2. Other devices, components, and/or logic that are not illustrated may also be included in the receiving device 118.

The receiving device 118 receives program content 212 and program information 214 via the communication system 108. As discussed above, the program content 212 may include video, audio, and/or data associated with one or more channels of programming. The program information 214 includes "meta" information about the program content 212, such as channel names, program descriptions, etc. When program information 214 is received, it may be stored in the data repository 302. In addition, the EPGG 200 may store at least some of the received program information 214 in the EPG information data repository 208 for use in generating electronic program guides.

In one example, a user may use the input device 210 to control the receiving device 118. For example, a user may utilize the input device 210 to select a particular channel of programming. In response, the receiving device 118 selects a program content stream within the program content 212 corresponding to the selected channel. The video and/or audio data in the selected program content stream may then be decompressed and/or decrypted by the video processing system 304, prior to being transmitted for presentation by the presentation device 120. The input device 210 may be used to change the operational state of the receiving device 118 in other ways, such as to change volume, to display subtitles, to power on or off, to display an electronic program guide, etc.

Upon the occurrence of various types of events, the activity tracker 204 stores and/or updates a record in the usage information data repository 206 indicating the occurrence of that event. For example, upon the selection of a first channel, the activity tracker 204 may create first record in the usage information data repository 206 indicating that the first channel has been selected, possibly along with additional information, such as date and time. Later, when a second channel is selected, the activity tracker may update the first record to indicate the amount of time the particular channel was viewed, and then create a second record to maintain information about the viewing of the second channel.

In addition, the generator 202 determines channels of interest based on the information tracked by the activity tracker 204, and stored in the usage information data repository 206. As discussed above, such a determination may be made by ordering, filtering, and/or otherwise processing usage information based on various criteria, such as time viewed, frequency of viewing, user identity, etc. Indications of the determined channels of interest may then be stored in the EPG information data repository 208 and/or provided to the video processing system 304 for transmittal to the presentation device 120.

In the illustrated embodiment, the EPGG 200 is implemented primarily in software. In particular, the generator 202 and the activity tracker 204 comprise software modules containing instructions that, when executed, perform the functions of the EPGG 200. The video processing system 304 includes a processor that is configured to execute the instructions, and process the data, of the EPGG 200.

The data repositories 206, 208, and 302 may be implemented in various ways. For example, the usage information data repository 206 may be a relational database system, such that the activity tracker 204 and the generator 202 may perform at least some of their functions by respectively making updates to and queries of the database. In another embodiment, one or more of data repositories 206, 208, and 302 may be implemented in other ways, such as flat files, directory structures, etc.

Furthermore, in some embodiments, some or all of the components of the EPGG may be implemented or provided in other manners, such as at least partially in firmware and/or hardware, including, but not limited to one ore more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The EPGG 200 may be implemented and/or structured in various other ways. In particular, the functions of the EPGG 200 may be performed by a different arrangement of components and/or modules of the receiving device 118, including a greater or lesser number of components. For example, the usage information data repository 206 and the EPG information data repository 208 may actually reside in, or be part of, the data repository 302. Also, the generator 202 and the activity tracker 204 may be implemented as a single software module, rather than two distinct modules as illustrated.

D. Processes

Figure 6:
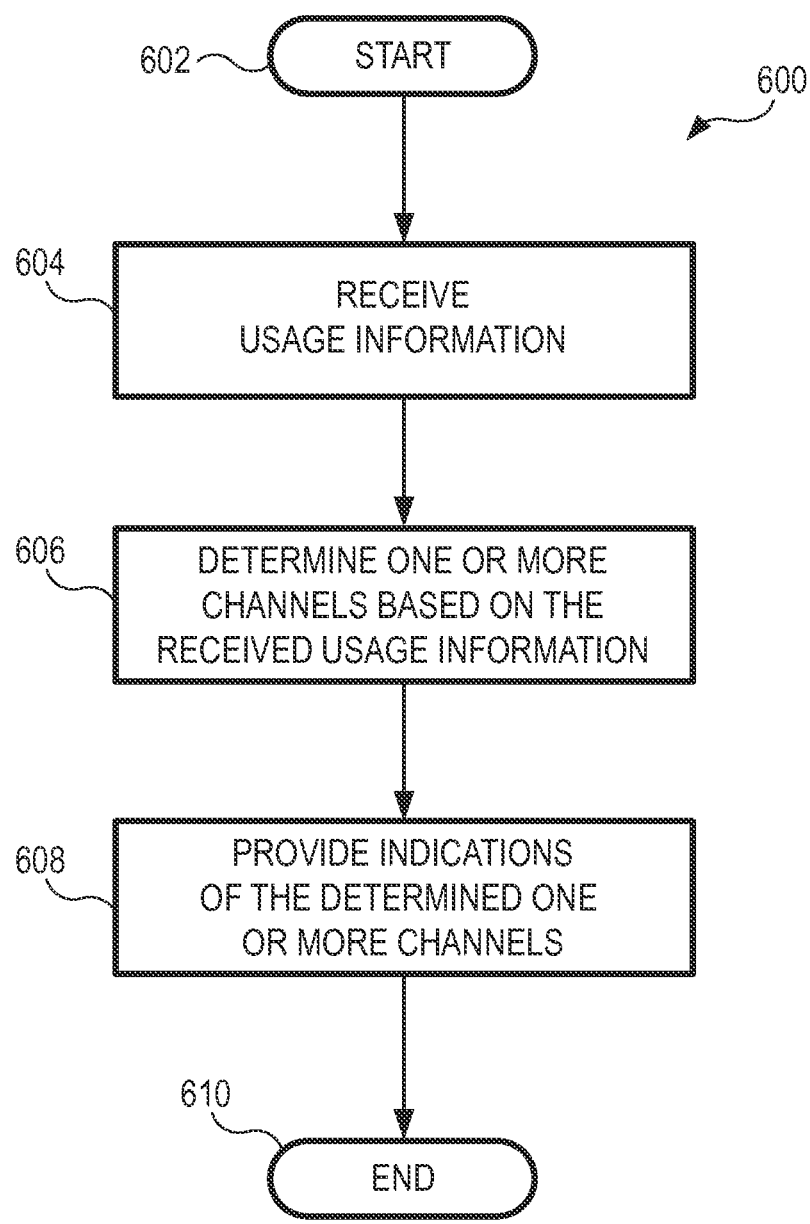
FIG. 6 is a flow diagram of an example electronic program guide generator process provided by an example embodiment.

FIG. 6 includes a flowchart of process 600, used by an embodiment of an EPGG 200 (FIG. 2). In this regard, the described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

FIG. 6 is a flow diagram of an example electronic program guide generator process 600 provided by an example embodiment. The process 600 may be implemented by, for example, but not limited to, one or more hardware, firmware, and/or software modules, components, and/or devices, such as are illustrated in the receiving device 118 described with reference to FIG. 5, such as the generator 202, the activity tracker 204, and/or the video processing system 304.

The process 600 starts at 602. At 604, the process receives usage information. The usage information may be received from, for example, the usage information data repository 206, the activity tracker 204, and/or the video processing system 304. In the illustrated embodiment, the received usage information may include indications of one or more previously viewed channels of video programming. In addition, received usage information may include sufficient information to provide an operational history of a receiving device 118, such as a sequence of channels viewed, possibly accompanied by other information, such as viewing time and/or date, user information, program information, etc.

At 606, the process determines one or more channels based on the received usage information. In some embodiments, this may include processing the received usage information to determine one or more channels that meet specified criteria. Such processing may include filtering (e.g., eliminating channels from consideration that do not meet specified criteria), ordering (e.g., sorting by a specified relation), accumulating (e.g., summing viewing time for multiple viewing periods associated with a single channel), etc. In one example embodiment, the process may select a predetermined number of the most commonly viewed channels, based on a total viewing time for each previously viewed channel. In another embodiment, the process may select a predetermined number of the most recently viewed channels.

At 608, the process provides indications of the determined one or more channels. In some embodiments, this may include storing the determined indications in a data repository, such as the EPG information data repository 208; transmitting the determined indications for display or other presentation by a presentation device 120; transmitting the determined indications to a remote system, such as the program distributor 106; etc. The indicated channels may be stored in various ways, such as in a flat file, a structured file (e.g., an XML file), via a database system, etc.

At 610, the routine ends. In some embodiments, the routine may be performed repeatedly, such as every hour to continually update electronic program guide information based on accumulated usage information.

It is to be appreciated that although the techniques have been here described primarily with reference to providing an electronic program guide based on channels viewed by a user, the described techniques may be used to provide an electronic program guide based on other information about a user's viewing habits. For example, the described techniques may be utilized to determine one or more categories (e.g., comedy, drama, sports, news, etc.) and/or ratings (e.g., quality, maturity level, etc.) of interest based on the viewing habits of one or more users. In addition, such determined information may be utilized for other purposes than preparing and displaying an electronic programming guide, such as for targeted advertisement, recommended programming, etc.

In addition, in some embodiments, the functionality provided by the processes discussed above may be provided in other ways, such as being split among more processes or consolidated into fewer processes. Similarly, in some embodiments illustrated processes may provide more or less functionality than is described, such as when other illustrated processes instead lack or include such functionality respectively, or when the amount of functionality that is provided is altered. In addition, while various operations, actions, and/or activities may be illustrated as being performed in a particular manner and/or in a particular order (e.g., in serial), those skilled in the art will appreciate that in other embodiments the operations may be performed in other orders and in other manners (e.g., in parallel).

It is also appreciated that data objects, representations, and structures discussed herein, such as electronic program guides, usage information, program content, and program information, may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

While various embodiments have been described hereinabove, it is to be appreciated that various changes in form and detail may be made without departing from the spirit and scope of the invention(s) presently or hereafter claimed.

The invention claimed is:

1. A method to determine electronic program guide information, the method comprising:

receiving, by a system for determining electronic program guide information, usage information of previous usage that includes indications of a plurality of video channels previously viewed via a set-top box operable to receive digital video programming via a broadcast network, the usage information including, for each of the plurality of video channels, one or more records, each record including a viewing time corresponding to the video channel and an identifier indicating whether the previous usage was by an identified user or an unknown user, wherein a value of the identifier is based on whether an identification of a user had occurred;

determining, by the system for determining electronic program guide information, one or more channels of the plurality of video channels based on the indications of the plurality of video channels previously viewed and, for each of the plurality of video channels, the viewing time corresponding to the video channel included in the received usage information;

ordering the determined one or more channels based on total viewing time;

providing, by the system for determining electronic program guide information, to a presentation device communicatively coupled to the set-top box indications of the determined one or more channels as part of an electronic program guide by at least generating a selectable list of the ordered determined one or more channels, with a channel having the highest total viewing time appearing at a top of the selectable list, and including the selectable list of the determined one or more channels in the electronic programming guide;

selecting, by the system for determining electronic program guide information, programming as suggested programming based on the usage information and whether the previous usage was by an identified user or an unknown user;

determining, by the system for determining electronic program guide information, one or more suggested channels having the suggested programming based at least in part on similarity between the one or more suggested channels and at least one of the determined one or more channels, and such that none of the one or more suggested channels are any of the determined one or more channels; and adding, by the system for determining electronic program guide information, a selectable list of the suggested one or more channels to the electronic program guide in addition to the selectable list of the determined one or more video channels that were determined by the system based on the indications of the plurality of video channels previously viewed and, for each of the plurality of video channels, the viewing time corresponding to the video channel, such that the electronic program guide includes a list of channels that consists of the selectable list of the determined one or more video channels that were determined by the system based on the indications of the plurality of video channels previously viewed and, for each of the plurality of video channels, the viewing time corresponding to the video channel and of the selectable list of the suggested one or more channels, wherein the electronic program guide is a two-dimensional grid, with channels displayed along a first dimension and time displayed along a second dimension.

2. The method of claim 1 wherein the determining of the one or more channels is based at least in part on the total viewing time corresponding to each of the one or more channels, each total viewing time reflecting how long the corresponding channel was selected for viewing.

3. The method of claim 1 wherein the determining of the one or more channels is based at least on part on one or more criteria, the criteria including at least one of total channel viewing time, channel viewing frequency, channel category, channel rating, and channel viewer identity.

4. The method of claim 1 wherein each record additionally includes a viewing date, a channel content category, a channel rating, and a program identifier.

5. The method of claim 1 wherein the determining of the one or more channels comprises selecting the one or more channels based on the viewing time corresponding to each of the one or more channels being not less than the viewing time corresponding to each of the plurality of video channels that is not one of the determined one or more channels.

6. The method of claim 1, further comprising:
recording indications of video channels viewed via the set-top box.

7. The method of claim 1 wherein the providing of the indications of the determined one or more channels comprises displaying the electronic program guide on the presentation device communicatively coupled to the set-top box.

8. The method of claim 1 wherein the none of the one or more suggested channels are any of the plurality of video channels previously viewed or a channel currently viewed.

9. The method of claim 1, further comprising:
receiving input from the user specifying criteria to be used in generating a first additional electronic program guide;
receiving input from the user to specifically display the additional electronic program guide;
generating the first additional electronic program guide based on the electronic program guide that includes the selectable list of the determined one or more channels and includes the selectable list of the suggested one or more channels, wherein the generating includes:
filtering out channels from the electronic program guide that includes the selectable list of the determined one or more channels and includes the selectable list of the suggested one or more channels based on the received input from the user specifying criteria to be used in generating the first additional electronic program guide; and
including in the first additional electronic program guide, a selectable list of remaining channels of the determined one or more channels and of the suggested one or more channels listed in the filtered electronic program guide; and
in response to the received input from the user to specifically display the first additional electronic program guide, communicating the first additional electronic program guide to a presentation device to display the first additional electronic program guide.

10. The method of claim 9 wherein the specified criteria to be used in generating the first additional electronic program guide based on the electronic program guide that includes the selectable list of the determined one or more channels and includes the selectable list of the suggested one or more channels includes criteria to filter the electronic program guide that includes the selectable list of the determined one or more channels and includes the selectable list of the suggested one or more channels based on channel category.

11. The method of claim 10 wherein the specified criteria to be used in generating the first additional electronic program guide based on the electronic program guide that includes the selectable list of the determined one or more channels and includes the selectable list of the suggested one or more channels includes criteria to filter the electronic program guide that includes the selectable list of the determined one or more channels and includes the selectable list of the suggested one or more channels based on channels viewed within a particular time period.

12. The method of claim 9 further comprising:
receiving input from the user specifying criteria to be used in generating a second additional electronic program guide, wherein the received criteria to be used in generating the second additional electronic program guide includes criteria to filter the electronic program guide that includes the selectable list of the determined one or more channels and includes the selectable list of the suggested one or more channels based on usage history of another user that is a member of a same household as the user;
receiving input from the user to specifically display the second additional electronic program guide;
generating the second additional electronic program guide based on the electronic program guide that includes the selectable list of the determined one or more channels and includes the selectable list of the suggested one or more channels, wherein the generating includes:
filtering out channels from the electronic program guide that includes the selectable list of the determined one or more channels and includes the selectable list of the suggested one or more channels, based on the usage history of the other user that is a member of a same household as the user; and
including in the second additional electronic program guide, a selectable list of remaining channels of the determined one or more channels and the suggested one or more channels listed in the filtered electronic program guide that was filtered based on the usage history of the other user; and
in response to the received input from the user to specifically display the second additional electronic program guide, communicating the second additional electronic program guide to a presentation device to display the second additional electronic program guide.

13. The method of claim 1, wherein the selecting programming as suggested programming based on the usage information and whether the previous usage was by an identified user or an unknown user includes selecting programming as suggested programming based on payments received by a program distributor from a content provider that provides a channel which the suggested programming is on.

14. The method of claim 1, further comprising:
determining a good or service targeted to the user based on usage information associated with the user; and
including, as part of the electronic program guide that includes the selectable list of the determined one or more channels and includes the selectable list of the suggested one or more channels, an indication of the good or service targeted to the user determined based on usage information associated with the user.

15. An apparatus that determines electronic program guide information, the apparatus comprising:
a video processing system operable to present video programming; and
an electronic program guide generator communicatively coupled to the video processing system, the electronic program guide generator operable to:
determine one or more channels of video programming of interest based on indications of a plurality of video channels previously viewed and, for each of the plurality of video channels, a viewing time corresponding to the video channel included in usage information of previous usage that includes the indications of the plurality of previously viewed channels of video programming, and the usage information including, for each of the plurality of previously viewed channels, one or more records, each record including the viewing time corresponding to the video channel and an identifier indicating whether the previous usage was by an identified user or an unknown user, wherein a value of the identifier is based on whether an identification of a user had occurred;
order the determined one or more channels based on total viewing time;
provide indications of the determined one or more channels of video programming of interest to the video processing system by the program guide generator at least being operable to generate a selectable list of the ordered determined one or more channels of video programming of interest, with a channel having the highest total viewing time appearing at a top of the selectable list, and include the selectable list of the determined one or more channels of video programming of interest in the electronic programming guide;
select programming as suggested programming based on the usage information and based on whether the previous usage was by an identified user or an unknown user;
determine one or more suggested channels having the suggested programming based at least in part on similarity between the one or more suggested channels and at least one of the determined one or more video channels of video programming of interest; and
add a selectable list of the suggested one or more channels to an electronic program guide in addition to the selectable list of the determined one or more channels of video programming of interest that were determined based on indications of the plurality of video channels previously viewed and, for each of the plurality of video channels, the viewing time corresponding to the video channel included in the such that the electronic program guide includes a list of channels that consists of the selectable list of the determined one or more channels of video programming of interest that were determined by the system based on the indications of the plurality of video channels previously viewed and, for each of the plurality of video channels, the viewing tune corresponding to the video channel and of the selectable list of the suggested one or more channels, wherein the electronic program guide is a two-dimensional grid, with channels displayed along a first dimension and time displayed along a second dimension.

16. The apparatus of claim 15 wherein the electronic program guide generator is further operable to transmit the electronic program guide to a device other than the video processing system.

17. The apparatus of claim 15 further comprising an activity tracker, the activity tracker operable to:
receive an indication of a channel of video programming being presented by the video processing system;
record the indication of the channel as part of the usage information; and
provide the usage information to the electronic program guide generator.

18. The apparatus of claim 15 wherein the usage information includes a total viewing time corresponding to each of the previously viewed channels of video programming, each total viewing time reflecting how long the corresponding channel was selected for viewing.

19. The apparatus of claim 18 wherein the electronic program guide generator is further operable to determine the one or more channels of video programming of interest based on the total viewing time corresponding to at least some of the previously viewed channels of video programming.

20. The apparatus of claim 15 wherein the electronic program guide generator includes instructions executed by the video processing system, and further comprising:
a memory communicatively coupled to the video processing system, the memory configured to store the electronic program guide generator.

21. The apparatus of claim 15 wherein the apparatus is a receiving device configured to receive digital video programming via a satellite network.

22. A non-transitory computer-readable medium whose contents enable a computing system to determine electronic program guide information, by performing a method comprising:

- recording indications of a plurality of video channels previously selected for viewing by one or more users, the plurality of video channels including digital video programming received via a broadcast network, the recorded indications including, for each of the plurality of video channels, one or more records, each record including a viewing time corresponding to the video channel and an identifier indicating whether the viewing time was by an identified user or an unknown user, wherein a value of the identifier is based on whether an identification of a user had occurred;
- determining one or more of the plurality of video channels based on the recorded indications of the plurality of video channels previously viewed and, for each of the plurality of video channels, the viewing time corresponding to the video channel;
- ordering the determined one or more channels based on total viewing time;
- generating an electronic programming guide that includes indications of the determined one or more video channels, by at least generating a selectable list of the ordered determined one or more video channels, with a channel having the highest total viewing time appearing at a top of the selectable list, and including the selectable list of the determined one or more video channels in the electronic programming guide;
- selecting programming as suggested programming based on the indications of the plurality of video channels previously selected for viewing and based on whether the viewing time was by an identified user or an unknown user;
- determining one or more suggested video channels having the suggested programming based at least in part on similarity between the one or more suggested video channels and at least one of the determined one or more video channels, and such that none of the one or more suggested video channels are any of the determined one or more video channels;
- adding a selectable list of the suggested one or more video channels to an electronic program guide in addition to the selectable list of the determined one or more video channels that were determined based on the recorded indications of the plurality of video channels previously viewed and, for each of the plurality of video channels, the viewing time corresponding to the video channel, such that the electronic program guide includes a list of channels that consists of the selectable list of the determined one or more video channels that were determined based on the recorded indications of the plurality of video channels previously viewed and, for each of the plurality of video channels, the viewing time corresponding to the video channel and of the selectable list of the suggested one or more video channels, wherein the electronic program guide is a two-dimensional grid, with channels displayed along a first dimension and time displayed along a second dimension; and
- transmitting the electronic program guide for presentation by a presentation device.

23. The non-transitory computer-readable medium of claim 22 wherein the computer-readable medium is part of a receiving device operable to receive and present the digital video programming received via the broadcast network.

24. The non-transitory computer-readable medium of claim 22 wherein the computer-readable medium is a memory in a computing device.

25. The non-transitory computer-readable medium of claim 22 wherein the contents are instructions that when executed cause the computing system to perform the method.

26. The non-transitory computer-readable medium of claim 22 wherein the transmitting includes transmitting the electronic program guide to a geographically remote location for presentation by a presentation device at the remote location.

27. The non-transitory computer-readable medium of claim 26 wherein the transmitting includes transmitting the electronic program guide from a program distributor to a geographically remote customer premises for presentation by a presentation device at the remote location.

* * * * *

UNITED STATES PATENT AND TRADEMARK OFFICE
CERTIFICATE OF CORRECTION

| | | |
|---|---|---|
| PATENT NO. | : 9,055,260 B2 | Page 1 of 1 |
| APPLICATION NO. | : 11/958312 | |
| DATED | : June 9, 2015 | |
| INVENTOR(S) | : Kerry Philip Miller | |

It is certified that error appears in the above-identified patent and that said Letters Patent is hereby corrected as shown below:

Column 13, Line 49:
"one or more channels based at least on part on one or more" should read, --one or more channels based at least in part on one or more--.

Signed and Sealed this
Twenty-ninth Day of December, 2015

Michelle K. Lee
*Director of the United States Patent and Trademark Office*